United States Patent [19]
Clark

[11] 4,105,183
[45] Aug. 8, 1978

[54] REAR VIEW MIRROR ASSEMBLY

[76] Inventor: Raleigh E. Clark, 7331 S. Kingston, Chicago, Ill. 60649

[21] Appl. No.: 688,126

[22] Filed: May 20, 1976

[51] Int. Cl.² ............................ A47G 1/24; G02C 7/14
[52] U.S. Cl. ...................................... 248/484; 350/298; 351/50
[58] Field of Search .................. 351/50, 158; 350/248, 350/249, 298; 248/481, 484; 2/DIG. 8

[56] References Cited
U.S. PATENT DOCUMENTS

| | | | |
|---|---|---|---|
| 3,423,150 | 1/1969 | Freed | 351/50 |
| 3,988,058 | 10/1976 | Chaney et al. | 351/50 X |

Primary Examiner—Paul A. Sacher
Attorney, Agent, or Firm—Thomas R. Vigil

[57] ABSTRACT

A removably mounted, slidably engagable, pivoting rear view mirror attachment for use on the temple portion of most conventional eye glasses.

1 Claim, 3 Drawing Figures

REAR VIEW MIRROR ASSEMBLY

BACKGROUND OF THE INVENTION

This invention relates to eye glasses; more particularly, to a rear view mirror assembly for use in connection therewith. The assembly being both removably and slidably mounted on the spectacle frame; the mirror portion thereof being adjustably pivotably disposed thereby providing for a variable field of rear vision.

The prior art teaches a variety of rear view seeing attachments for eyeglasses, such as is disclosed in U.S. Pat. Nos. 1,691,789; 1,916,110; 2,175,896; 2,176,167; 2,331,640; 2,371,196; 2,545,583; 2,739,508; 3,423,150; and others.

SUMMARY OF THE INVENTION

It is accordingly an object of the instant invention to provide for a new and improved rear vision mirrored assembly for conventional spectacles.

It is another object to provide for an assembly having the foregoing attributes.

It is a further object to provide for the same at relatively little cost thereby making it generally available.

These and other objects and advantages of the invention will become more apparent from the following detailed disclosure and claims and by reference to the accompanying drawings, in which:

Figure 1:
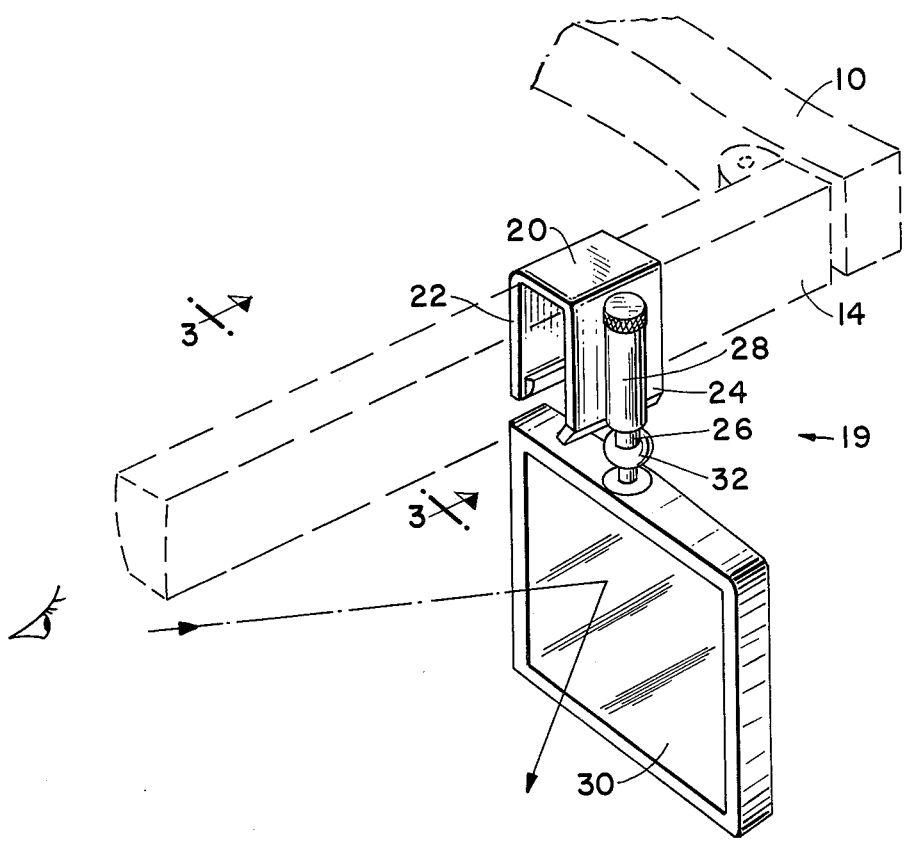
FIGS. 1 and 2 are perspective views.
Figure 2:
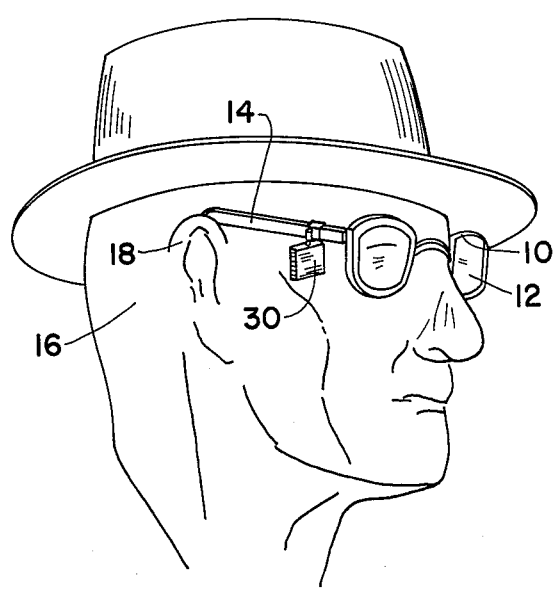
Figure 3:
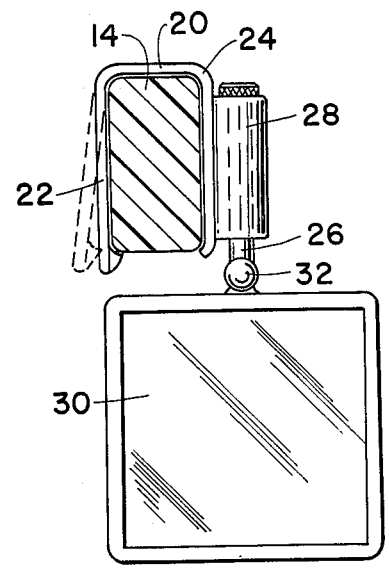
FIG. 3 is an end elevational view.

Broadly speaking, the instant invention includes in combination with a pair of spectacles having temple portions, means slidably engaging said temple portions, a hollow housing disposed on the means, a shaft journalled for rotation in the housing, a reflective surface depending from the shaft, pivot means communicating between the shaft and the surface whereby the surface is rotatable about 360°.

DETAILED DISCLOSURE

Referring more particularly to the drawings, there is shown a conventional pair of spectacles that includes a frame portion 10 having opening for holding the lenses 12 and a pair of side temple portions 14 for engaging the side of the head 16 and the ear 18. The foregoing is generally universal. The instant assembly 19 comprises means 20 such as a U shaped bracket that are adapted to slidably engage the temple portion 14, such as frictionally, thereby permitting the assembly 19 to move forward and backward upon the temple portion 14. In the preferred embodiment, one leg 22 of the means 20 will be a resiliant member, such as a rubber portion, thereby providing for ease of movement of the means 20.

Disposed on the opposite leg or side panel 24 of the means 20 is shaft 26 that is journelled for rotation in a housing 28 therefor. Depending from the shaft 26 is a reflective member 30 such as a mirror or metallic piece that is in communication with the shaft 28 through a pivot member 32, such that the member 30 will pivot about the shaft 28, such as 360° thereabout.

Since it is obvious that numerous changes and modifications can be made in the above-described details without departing from the spirit and nature of the invention, it is to be understood that all such changes and modifications are included within the scope of the invention.

I claim:

1. For use with a pair of eyeglasses having temples, a rear view mirror assembly comprising a flexible, inverted U-shaped bracket adapted to be received frictionally over one of the temples, a hollow housing mounted on and to an outer side surface of said bracket, a shaft journaled in said housing, a pivot member mounted to the lower end of said shaft, a planar member depending from and secured to said pivot member, and a reflective surface on at least one side of said planar member.

* * * * *